United States Patent [19]

Mihara et al.

[11] Patent Number: 5,742,369
[45] Date of Patent: Apr. 21, 1998

[54] METHOD OF ALIGNING LIQUID CRYSTALS BY APPLYING AN ALTERNATING ELECTRIC FIELD UNDER PERIODICALLY CHANGING TEMPERATURE

[75] Inventors: Tadashi Mihara; Yukio Hanyu, both of Isehara; Sunao Mori, Yokohama, all of Japan

[73] Assignee: Canon Kabushiki Kaisha, Tokyo, Japan

[21] Appl. No.: 361,521

[22] Filed: Dec. 22, 1994

[30] Foreign Application Priority Data

Dec. 28, 1993 [JP] Japan .................... 5-352113
Dec. 21, 1994 [JP] Japan .................... 6-335595

[51] Int. Cl.$^6$ ............... G02F 1/1337; G02F 1/13
[52] U.S. Cl. ............ 349/123; 349/172; 349/188; 349/191
[58] Field of Search ................. 359/75, 76, 77, 359/78, 90, 100, 79; 349/123, 169, 172, 188, 191

[56] References Cited

U.S. PATENT DOCUMENTS

| | | | |
|---|---|---|---|
| 4,367,924 | 1/1983 | Clark et al. .................. 359/56 |
| 5,041,821 | 8/1991 | Onitsuka et al. .................. 345/101 |
| 5,058,994 | 10/1991 | Mihara et al. .................. 359/56 |
| 5,109,294 | 4/1992 | Hanyu et al. .................. 359/83 |
| 5,119,219 | 6/1992 | Terada et al. .................. 359/56 |
| 5,196,955 | 3/1993 | Konuma et al. .................. 359/78 |
| 5,293,544 | 3/1994 | Hanyu et al. .................. 359/78 |
| 5,321,419 | 6/1994 | Katakura et al. .................. 345/97 |
| 5,381,256 | 1/1995 | Hanyu et al. .................. 359/79 |

FOREIGN PATENT DOCUMENTS

| | | |
|---|---|---|
| 0550846 | 7/1993 | European Pat. Off. . |
| 0553727 | 8/1993 | European Pat. Off. .......... 359/75 |
| 56-107216 | 8/1981 | Japan . |
| 63-121021 | 5/1988 | Japan .................. 359/100 |

*Primary Examiner*—William L. Sikes
*Assistant Examiner*—Walter J. Malinowski
*Attorney, Agent, or Firm*—Fitzpatrick, Cella, Harper & Scinto

[57] ABSTRACT

A method of aligning liquid crystals includes the steps of aligning chiral smectic liquid crystal sandwiched between a pair of substrates each having an electrode by applying an alternating electric field between the substrates under periodically changing temperature conditions in which a width of changes of the temperature for a single period differs in every period.

26 Claims, 14 Drawing Sheets

C1 ALIGNMENT    $\Theta + \delta > \alpha$

C2 ALIGNMENT    $\Theta - \delta > \alpha$

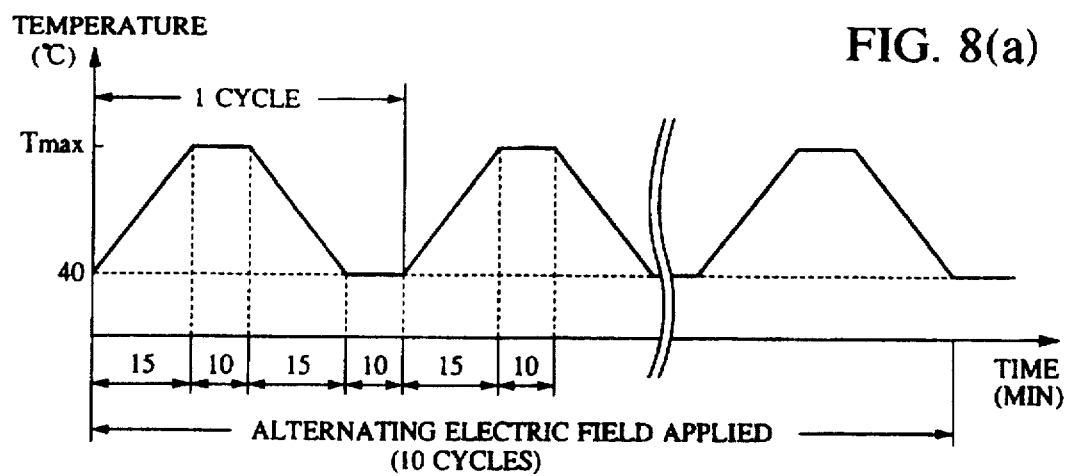
WAVEFORMS OF CONDITIONS 1 AND 2
(Tmax=72°C IN CONDITION 1)
(Tmax=88°C IN CONDITION 2)
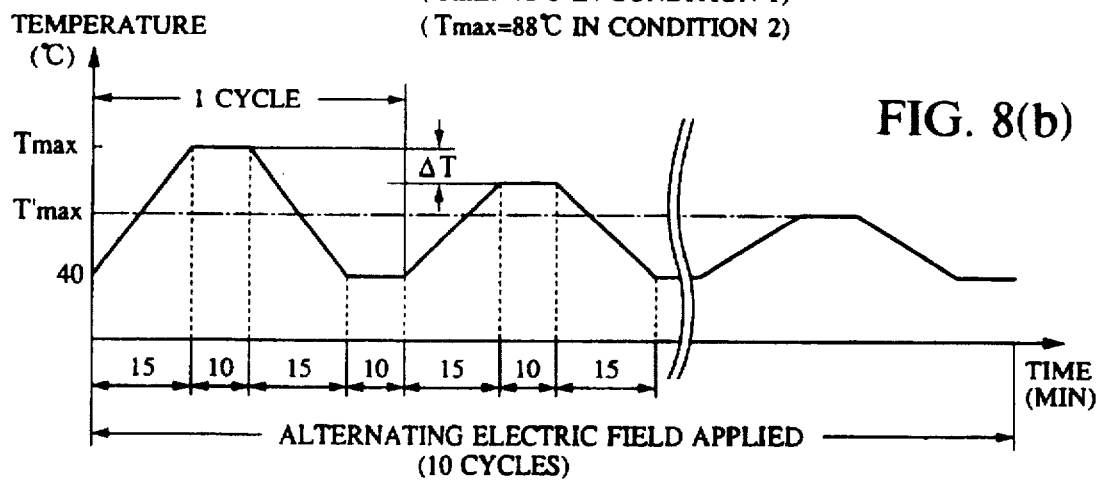
WAVEFORM OF CONDITION 3 (T'max − Tmax = 10 × ΔT)
ΔT=2°C   T'max=88°C   Tmax=70°C
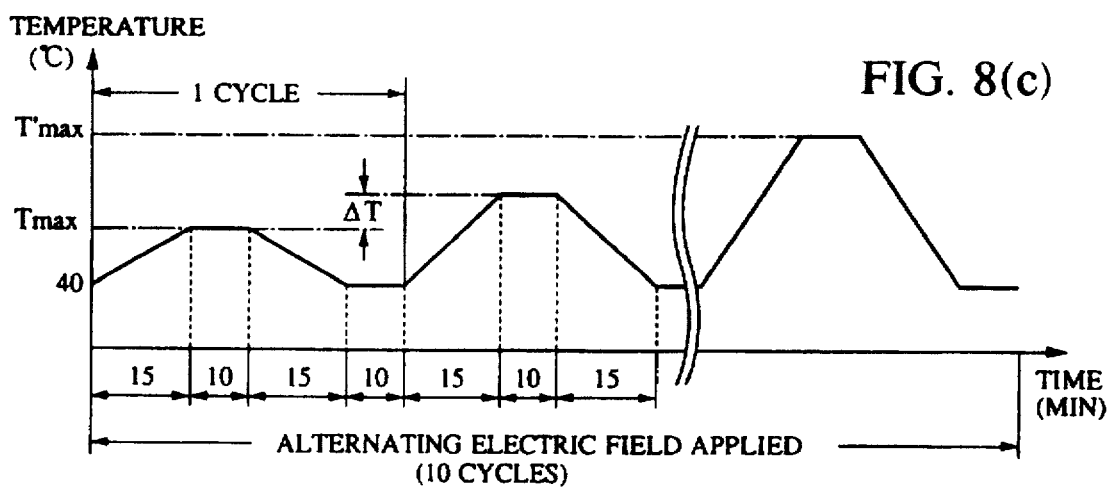
WAVEFORM OF CONDITION 4 (T'max − Tmax = 10 × ΔT)
ΔT=2°C   T'max=88°C   Tmax=70°C

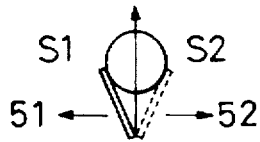
OO
DIRECTION OF RUBBING
FIG. 9(a)
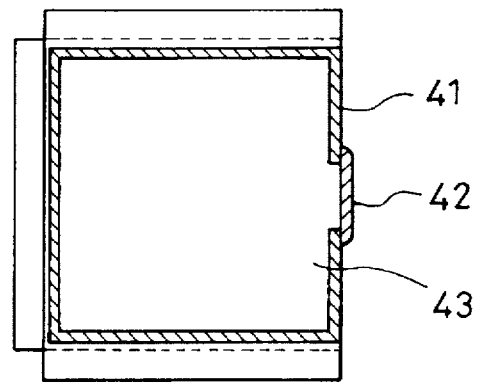
FIG. 9(b)
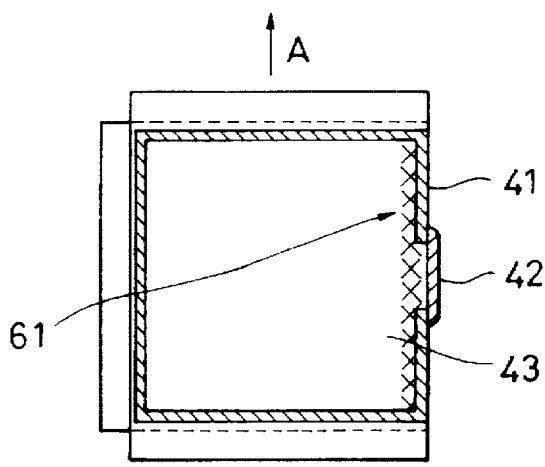
FIG. 9(c)
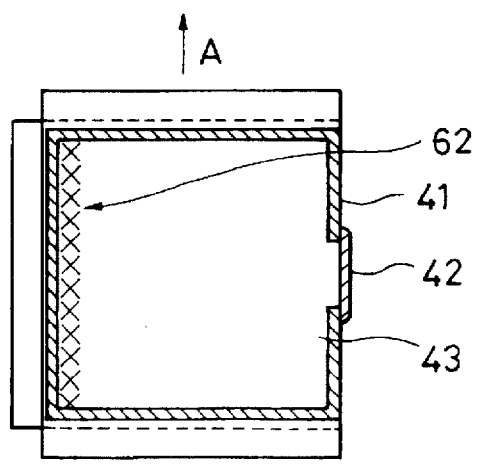

METHOD OF ALIGNING LIQUID CRYSTALS BY APPLYING AN ALTERNATING ELECTRIC FIELD UNDER PERIODICALLY CHANGING TEMPERATURE

BACKGROUND OF THE INVENTION

1. Field of the Invention

The present invention relates to a liquid crystal aligning method for liquid crystal devices in which chiral smectic liquid crystal is sandwiched between substrates each having an electrode and an aligning film, and more particularly, to a liquid crystal aligning method which enables prevention of shift of the liquid crystal in such a liquid crystal device, which shift would occur when the device is driven for a long time. The present invention also pertains to a method of manufacturing a liquid crystal device employing the above-described alignment technique, and a liquid crystal device manufactured employing the above alignment technique.

2. Description of the Related Art

Clark and Lagerwall have proposed the display device of the type in which transmission of light is controlled using polarization plates by utilizing anisotropy of the refractive index of ferroelectric liquid crystal molecules (in Japanese Patent Laid-Open No. Sho 56-107216). The ferroelectric liquid crystal employed in the above display device generally has chiral smectic phase in a special temperature range, and is characterized in that the liquid crystal molecules in chiral smectic phase take on either a first or second optically stable state in response to an applied electric field and remain in that state when the applied electric field is removed, i.e., exhibita so-called bistable mode. Further, the ferroelectric liquid crystal exhibits high-speed response to changes in the applied electric field. Therefore, the use of the ferroelectric liquid crystal as a high-speed and memory type display device has been anticipated.

However, it has been discovered according to the researches made by the present inventors and others that the ferroelectric liquid crystal molecules shift in the liquid crystal cell of the device in a special direction of the cell when the ferroelectric liquid crystal device has been driven for a long time, thus increasing the pressure at the end portion of the cell and, hence, the cell pressure. Although the reason for generation of the force which moves the liquid crystal molecules in the liquid crystal cell is not known, the present inventors infer that shift of the liquid crystal molecules occurs due to the electrodynamic effect generated as a consequence of fluctuation of bipolar moment of the liquid crystal molecule caused by application of an alternating electric field of a driving pulse.

The knowledge obtained in the experiments made by the present inventors regarding the above-described phenomena will be described below with reference to FIGS. 1(a) and (b). A direction 12 in which the liquid crystal molecule shifts is determined by a direction 10 of rubbing and average axis directions 11 and 11' of the liquid crystal molecule. Since the direction of shift of the liquid crystal molecule depends on the direction of rubbing, it is estimated that shift of the liquid crystal molecule depends on the pretilt of the molecules at the interface with the substrate. The average axis directions 11 and 11' represent the mean molecule positions in a bistable state of the liquid crystal molecule. When an alternating electric field having a magnitude which ensures that switching of the liquid crystal does not occur is applied to a liquid crystal having, for example, the average molecule axis direction 11, the liquid crystal molecules shift in a direction indicated by the arrow 12. This applies only to a liquid crystal material having spontaneous polarization in a negative direction.

In an actual liquid crystal cell, if the liquid crystal molecule position of the entire cell is in a state indicated by 11, as shown in FIG. 1(a), the liquid crystal molecule shifts from the right to the left of the surface of the paper, thus increasing the cell thickness at an area 13 as the time elapses, as shown in FIG. 1(b). Consequently, the liquid crystal takes a color of yellow, and durability of the liquid crystal device is adversely affected when driven continuously for a long time.

SUMMARY OF THE INVENTION

In view of the aforementioned problems of the prior art, a primary object of the present invention is directed to a liquid crystal device which employs chiral smectic liquid crystals including ferroelectric liquid crystals which enables suppression of an increase in the thickness of the cell at an end portion thereof, caused by shift of the liquid crystal molecules when the display device is driven continuously for a long time, as well as prevention of yellow coloring of the liquid crystal.

To achieve the above object, the present invention provides a method of aligning liquid crystals which comprises the step of treating chiral smectic liquid crystal sandwiched between a pair of substrates each having an electrode by applying an alternating electric field between the substrates under periodically changing temperature conditions in which a width of changes of the temperature for a single period differs in every period.

The present invention is also directed to a method of manufacturing liquid crystal devices by using the above method and a liquid crystal device manufactured employing the above method.

To achieve the above objects, the present invention provides a method of manufacturing liquid crystal devices which comprises the steps of forming a liquid crystal cell in which a pair of electrode substrates oppose each other with a gap therebetween, injecting chiral smectic liquid crystal between the substrates in the cell, and applying an alternating electric field to the electrode substrates at a periodically changing temperature, i.e., under temperature conditions in which the width of changes of the temperature for a single period differs in every period.

The present invention also provides a liquid crystal device in which chiral smectic liquid crystal is sandwiched between a pair of substrates which is characterized in that the chiral smectic liquid crystal is treated by applying an alternating electric field to the electrode substrates at a periodically changing temperature, i.e., under temperature conditions in which a width of changes of the temperature for a single period differs in every period.

In the present invention, shift of the liquid crystal molecule, which would occur when the liquid crystal device is driven for a long time, can be reduced, and high-speed response and excellent alignment state of molecules can be obtained stably.

BRIEF DESCRIPTION OF THE DRAWINGS

FIGS. 8(a), 8(b) and 8(c) show various temperature cycles in the alternating electric field application treatment employed in Examples of the present invention;

FIGS. 9(a), 9(b) and 9(c) schematically illustrate a method of evaluating an increase in the thickness of the cell in Examples of the present invention;

DETAILED DESCRIPTION OF THE PREFERRED EMBODIMENTS

Figure 1A:
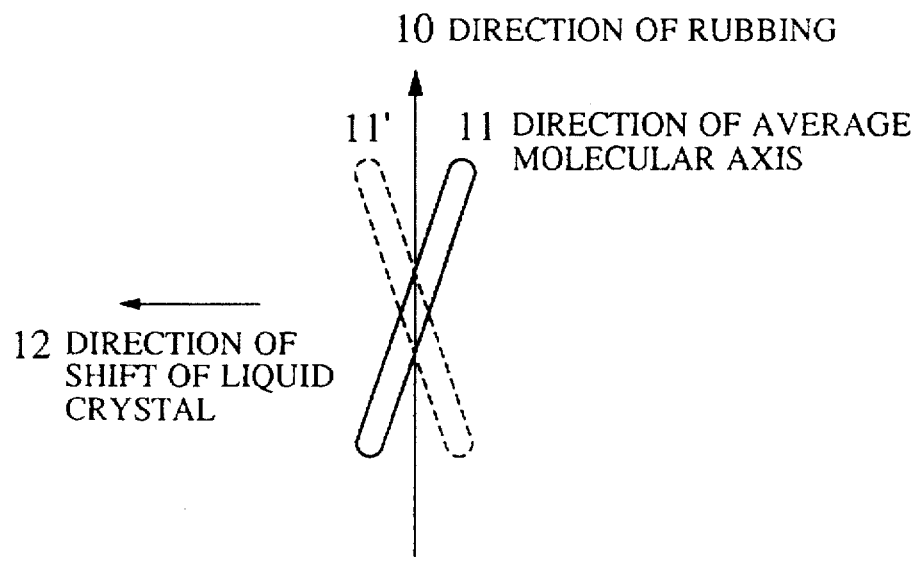
FIGS. 1(a) and 1(b) illustrate shift of the liquid crystal molecules in a liquid crystal device which occurs during drive of the device.
Figure 1B:
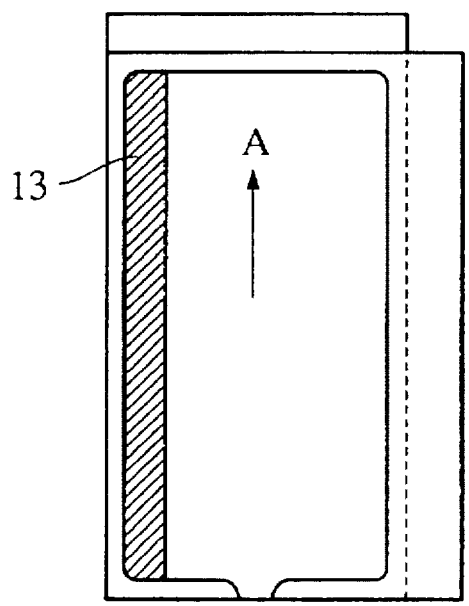

The method of aligning liquid crystals according to the present invention is characterized in that the alternating electric field application treatment of the chiral smectic liquid crystal is conducted under special temperature conditions, i.e., under temperature conditions in which the temperature changes periodically with the temperature width for a single period differing from that of the other periods.

In the above method, it is desirable that periodic increase and decrease of the temperature be repeated with the lowest temperature value in each period being fixed and with the highest temperature value in each period being varied in every period. In that case, the highest temperature value may be sequentially increased or decreased in every period at a fixed or non-fixed rate. More preferably, the highest temperature value is sequentially decreased in every period.

The above-described temperature variations can be set in a temperature range which allows the chiral smectic liquid crystal to show smectic phase. Particularly, the above temperature variations are those which ensure that the liquid crystal undergoes phase transition between smectic A phase and chiral smectic C phase in every period, more particularly, those in which at least the highest temperature value in each period is in a temperature range which ensures that the employed liquid crystal shows smectic A phase and in which at least the lowest temperature value in each period is in a temperature range which ensures that the employed liquid crystal shows chiral smectic C phase.

Application of an alternating electric field is done under the following conditions: the effective voltage to be applied is set to a value which is higher than the inversion threshold voltage (effective voltage) in an actual usage temperature in the temperature range which ensures that the used liquid crystal has chiral smectic C phase, more preferably, to a value which is 10 to 1000 times the threshold voltage. That is, when the temperature at which an alternating electric field is applied under the above-described temperature conditions is in the temperature range which ensures that the used liquid crystal shows chiral smectic C phase, the liquid crystal molecules can be inverted. In a practical operation, it is desirable that the peak value of the voltage be adjusted according to the used liquid crystal with the frequency being between 10 Hz and 1 kHz. The actual usage temperature of a used liquid crystal is generally the ambient temperature (about 25° C.) or higher than 40° C. if the liquid crystal is used under heating.

The method according to the present invention, i.e., application of an alternating electric field under the above-described temperature conditions, can be performed at any time in a state wherein the liquid crystal is injected in the cell, e.g., after the liquid crystal has been injected into the cell in the manufacturing process or when the liquid crystal device is used.

The structure of the liquid crystal cell (device) to which the present invention is applied will now be described in detail.

Figure 2A:
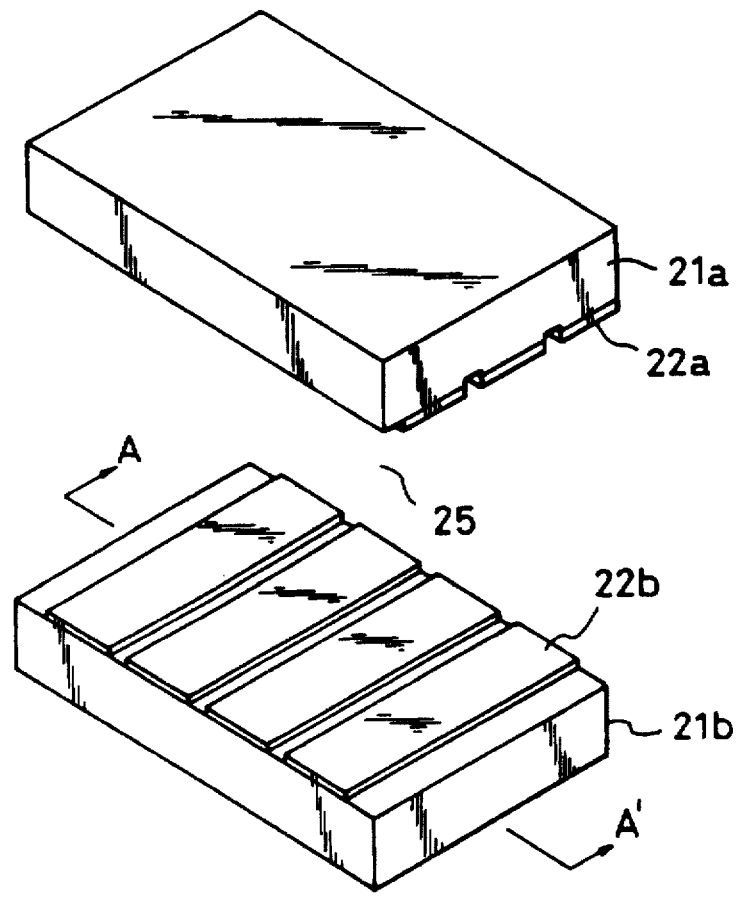
FIGS. 2(a) and 2(b) are respectively perspective and cross-sectional views showing an example of the structure of the liquid crystal cell in the present invention.
Figure 2B:
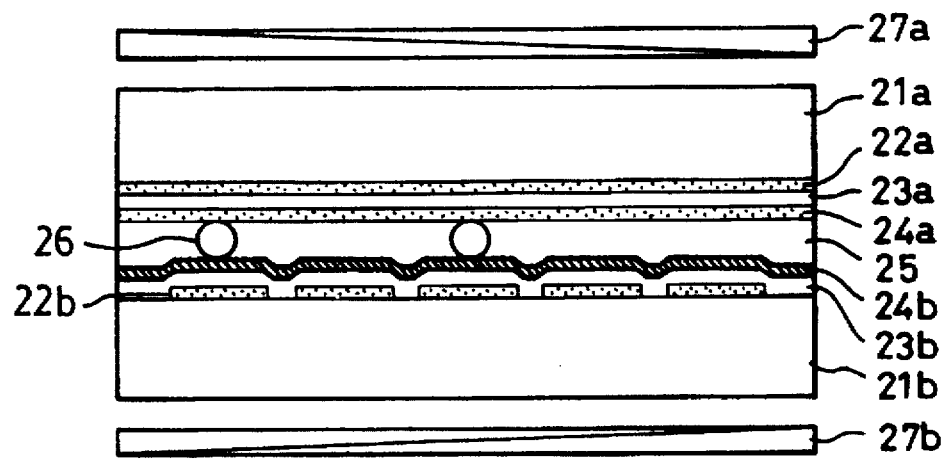

FIG. 2 (a) is a perspective view schematically illustrating an embodiment of a liquid crystal cell according to the present invention. FIG. 2(b) is a section taken along the line A—A' of FIG. 2(a). The liquid crystal cell has a pair of parallel-disposed upper and lower substrates 21a and 21b, and transparent electrodes 22a and 22b provided on the substrates 21a and 21b, respectively. The thickness of the transparent electrodes 22a and 22b is, for example, between 400 and 2000 Å. Between the upper and lower substrates 21a and 21b is disposed a smectic, preferably chiral smectic, liquid crystal 25 through alignment control films 24a and 24b, respectively. At least one of the alignment control films 24a and 24b is treated so that it can orderly align the smectic liquid crystal 25. This treatment enables the direction in which the layer of the smectic liquid crystal 25 is formed to be controlled. If necessary, insulator films 23a and 23b having a thickness of, for example, 200 to 3000 Å may be disposed between the alignment control film 24a and the transparent electrode 22a and between the alignment control film 24b and the transparent electrode 22b.

Spacers 26 each having an average diameter of 0.1 to 3.5 μm are scattered in the liquid crystal layer 25 to define the gap between the substrates (the thickness of the cell). Reference numerals 27a and 27b respectively denote polarizing plates.

The substrates 21a and 21b may be made of a metal, semiconductor or insulating material, such as glass, a polymer, quartz, silicon or Al.

The transparent electrodes 22a and 22b are thin films of, for example, $In_2O_3$, $SnO_2$ or ITO (Indium Tin Oxide).

An adequately selected organic or inorganic insulating material can be used as the alignment control films 24a and 24b. Examples of such insulating materials include: a coated film of an organic polymer, such as a polyvinyl alcohol, a polyimide, a polyamide imide, a polyester imide, a polyparaxylene, a polyester, a polycarbonate, a polyvinyl acetal, a polyvinyl chloride, a polyamide, a polystyrene, a cellulose resin, a melamine resin, a urea resin or an acrylic resin; and an obliquely evaporated film of SiO or $SiO_2$. Preferably, a polyamide (polyamic acid) obtained by heat condensing diamine and a carboxylic acid anhydride or a polyimide obtained by curing the polyamide.

A desirable alignment control film material is the one which assures a high pretilt (an angle of the liquid crystal molecules relative to the substrates) of the liquid crystal molecules disposed between the substrates, with more preferable material being the one which assures a pretilt of, for example, 10° to 30°. Examples of such a material include a polyimide containing fluorine, e.g., a polyimide synthesized from 1,1,1,3,3,3-hexafluoro 2,2-bis [4-(4-aminophynoxy) phenyl] propane and pyromellitic acid.

The thickness of the alignment control films 24a and 24b is set to a value ranging from 50 to 1000 Å.

At least one of the alignment control films 24a and 24b is subjected to uniaxial alignment treatment so that it can exhibit a liquid crystal alignment regulating force. Where a polymer film is used, rubbing is performed.

Figure 3A:
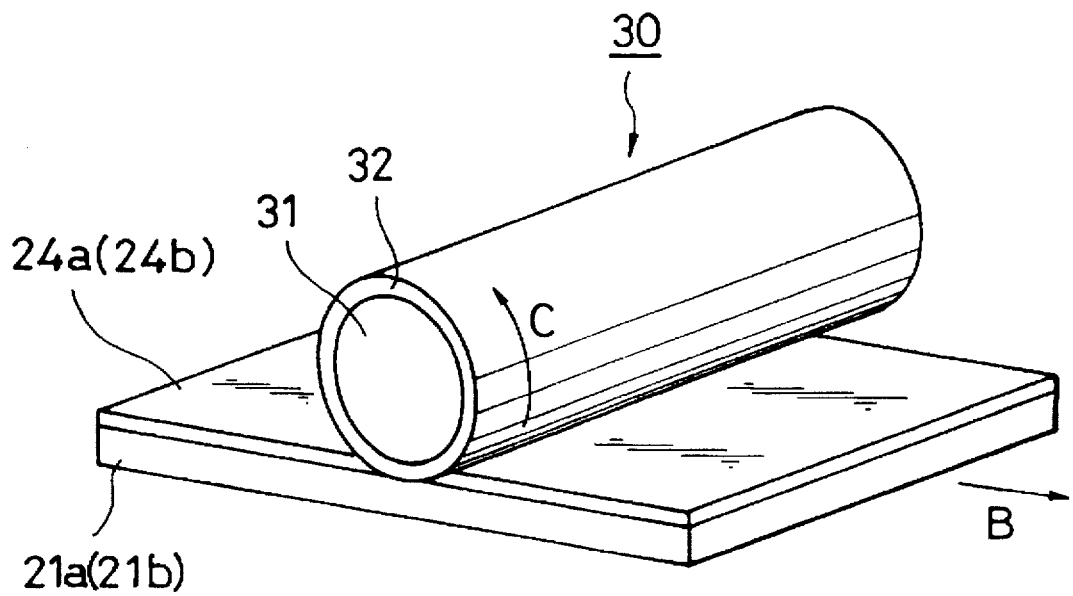
FIGS. 3(a) and 3(b) are respectively perspective and cross-sectional views showing rubbing employed in the present invention.
Figure 3B:
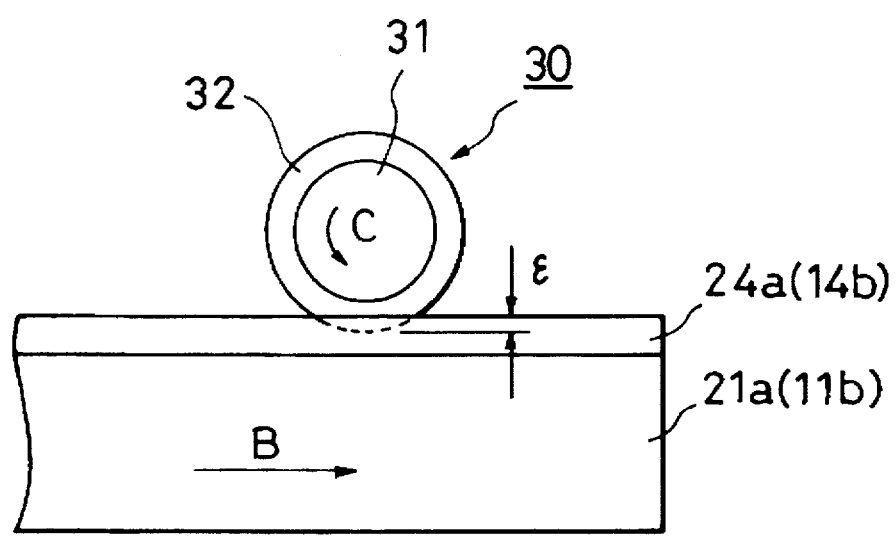

FIGS. 3(a) and 3(b) illustrate rubbing. A rubbing roller 30 has a structure in which a rubbing cloth 32, such as a nylon cloth, is attached to a cylindrical roller 31. The alignment regulating force is imparted to the alignment control film by bringing the rubbing roller 30 into contact with the alignment control film 24a (24b) on the glass substrate 21a (21b) under a predetermined pressure while rotating the roller 30 in a direction indicated by the arrow C and then by moving the glass substrate 21a (21b) (or the rubbing roller) in the direction indicated by the arrow B and thereby making the alignment control film 24a or 24b slide against the roller. The alignment regulating force is determined by the force at which the rubbing roller 30 is brought into contact with the glass substrate 21a (21b). Normally, the contact force is adjusted by controlling the amount of contact at which the rubbing cloth 32 is brought into contact with the alignment control film 24a or 24b, which is achieved by moving up or down the rubbing roller 30 (by changing an amount of push ϵ).

In the above-described uniaxial alignment treatment, particularly, in rubbing, it is desirable that an intersection angle between a direction of treatment for the upper substrate and a direction of treatment for the lower substrate be between 0° and 20° from the viewpoint of achievement of uniform alignment of the liquid crystal which will be described later.

The insulator films 23a and 23b provided between the alignment control film 24a and 24b and the transparent electrodes 22a and 22b when necessary are made of, for example, Ti-Si, $SiO_2$, $TiO_2$ or $Ta_2O_5$. Preferably, fine particles, such as silica beads or aluminum oxide, may be filled in the insulator films so as to make the surface of the alignment control films disposed above the insulator films irregular. In this way, shift of the liquid crystal molecules can be further restricted.

As the smectic liquid crystal 25 is employed a liquid crystal material which shows chiral smectic phase, such as SmC* phase, SmH* phase, SmI* phase, SmK* phase or SmG* phase, in a wide temperature range centered at the ambient temperature and which has at least two stable states. Preferably, a ferroelectric liquid crystal material having at least two stable states can be employed. Examples of such smectic liquid crystals include a phenyl pyrimidine type liquid crystal containing at least one chiral dopant, such as liquid crystal mixture containing pyrimidine compound showing the following phase transition and property values.

Pyrimidine type mixed liquid crystal

Cone angle θ = 14°

Inclination angle of the layer δ = 11°

Apparent tilt angle Θa = 11.5°

The cone angle is a physical tilt of the chiral smectic liquid crystal (ferroelectric liquid crystal), and the apparent tilt is one half of the angle of the liquid crystal between the two stable states.

The above-described physical parameters are measured in the manner described below.

Cone angle Θ

A first extinction position (a position where the transmittance becomes the lowest) is searched for by rotating a liquid crystal device disposed under crossed Nicol horizontally to the polarizing plates while applying DC voltage of 10 to 30 volts between the upper and lower substrates of the liquid crystal device, and next a second extinction position is searched for by applying a dc voltage of the opposite polarity. The cone angle Θ is one half of the angle formed from the first extinction position to the second extinction position.

Apparent tilt Θa

A first extinction position is searched for by rotating a liquid crystal device disposed under crossed Nicol horizontally to the polarizing plates while applying no electric field after applying a single pulse having a threshold value of the liquid crystal between the upper and lower substrates of the liquid crystal device, and next a second extinction position is searched for by applying no electric field after applying a pulse having an opposite polarity to that of the above-described single pulse. The apparent tilt Θa is one half of the angle formed from the first extinction position to the second extinction position.

Liquid crystals which do not show cholesteric phase may also be employed as the liquid crystal material.

In the present invention, the finally formed liquid crystal device takes on a uniform alignment state as the aligned state of chiral smectic liquid crystal (ferroelectric liquid crystal) so as to allow luminance or contrast of the display device to be improved. That is, in the liquid crystal device, the switching condition set by a combination of the liquid crystal material and the alignment control layer achieves an alignment state which ensures that the relationship between the apparent tilt Θa, which is one half of the angle of the liquid crystal formed between the two stable states, and the tilt (cone angle) Ⓗ of the liquid crystal material is expressed by Ⓗ/2≦Θa≦Ⓗ.

In an actual operation, the alignment control film, the liquid crystal material and other designing items are hence adjusted adequately in the liquid crystal cell having the above-described structure so as to allow the liquid crystal to exhibit a uniform alignment state before and after the treatment conducted by application of an alternating electric field.

The uniform alignment state to which the present invention is applied will be described in more detail.

Figure 4:
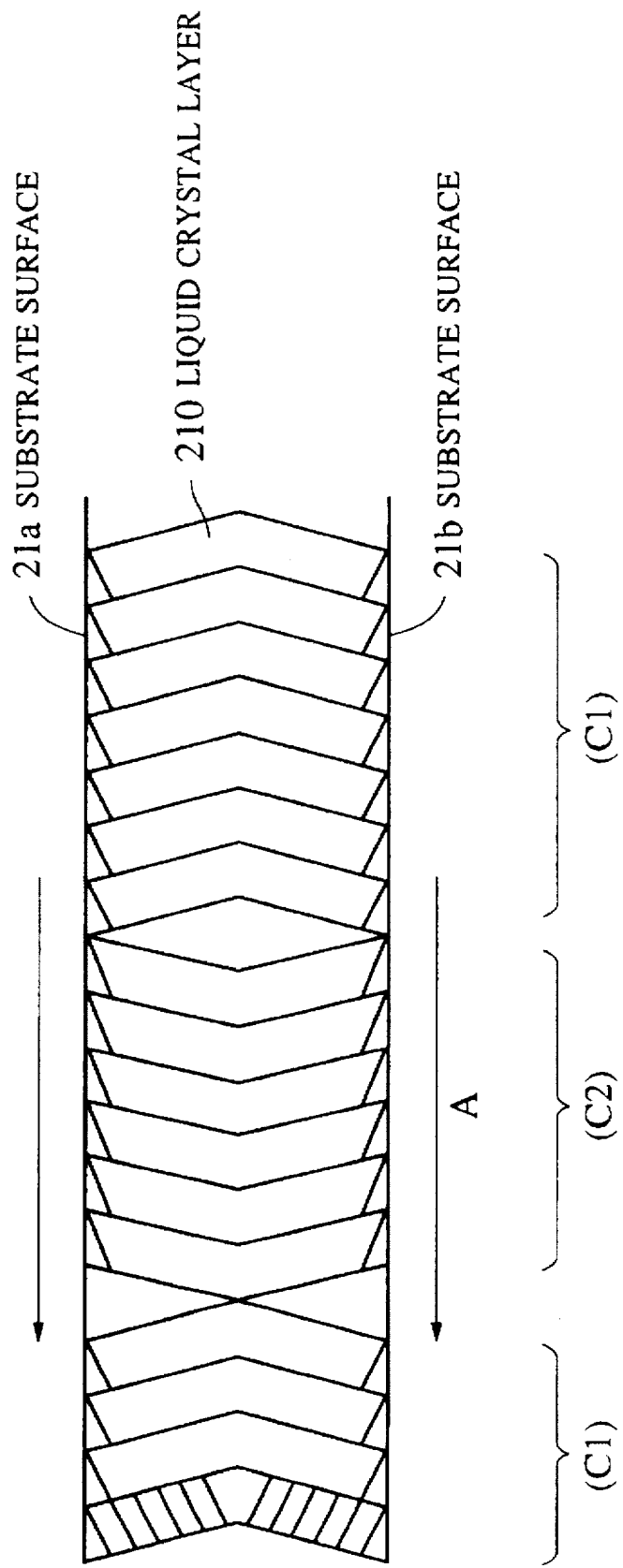
FIG. 4 schematically illustrates the layered structure of smectic liquid crystal.

Generally, the structure of the liquid crystal layer which takes on a uniform alignment state falls into C1 aligned state and C2 aligned state shown in FIGS. 4 and 5.

The smectic liquid crystal has a layered structure. When such a smectic liquid crystal undergoes phase transition from SmA phase to SmC phase or SmC* phase, a liquid crystal layer 210 shrinks and thus takes on a bending structure (chevron structure) between the substrates 21a and 21b, as shown in FIG. 4. In such a structure, there are two liquid crystal aligned states (C1 state and C2 state) in which the direction in which the liquid crystal layer of one state bends opposes the direction in which the liquid crystal layer of the other state bends relative to the direction of pretilt of the liquid crystal molecules, which will be described later.

Figure 5A:
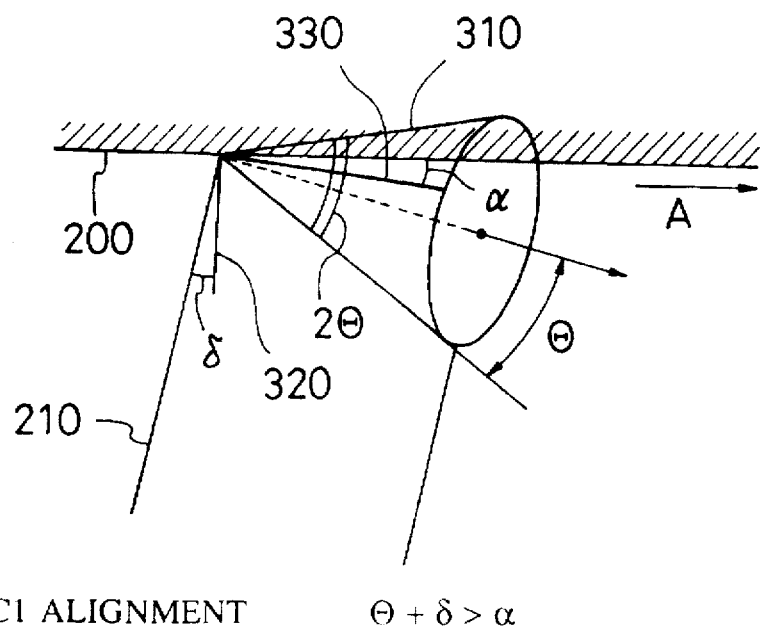
FIGS. 5(a) and 5(b) schematically illustrate the state of liquid crystal molecules located near an interface between a substrate and a liquid crystal in C1 and C2 alignment states, respectively.
Figure 5B:
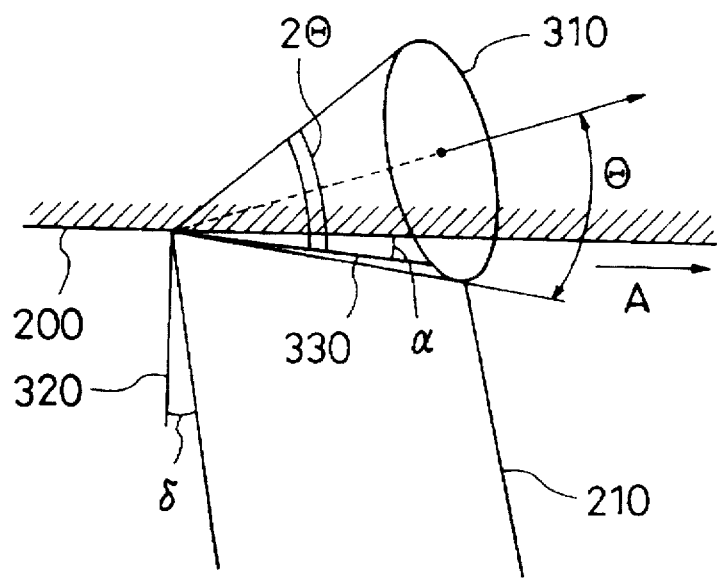

The director of the liquid crystal molecule located near the substrate in C1 or C2 state is present on a cone 310 shown in FIGS. 5(a) and 5(b). As is known, rubbing treatment tilts the liquid crystal molecules at the interface with the substrate at a pretilt (the angle formed between a substrate 200 and a liquid crystal molecule 330) relative to the substrate. The director of the liquid crystal molecule is directed in the uniaxial alignment direction, i.e., in a direction which ensures that the liquid crystal molecule raises its head (the distal end of the molecule floats) toward the direction of rubbing (which is indicated by A in FIGS. 5(a) and 5(b)). Thus, the cone angle $\vec{H}$, the pretilt $\alpha$ and the layer inclination angle $\delta$ (which is the angle formed between a normal 320 of the substrate and a liquid crystal layer 210) must have the relationship expressed as follows:

$\vec{H}+\delta>\alpha$ in C1 aligned state $\vec{H}-\delta>\alpha$ in C2 aligned state In the liquid crystal device, the uniform alignment state of C1 generates a large apparent tilt angle $\Theta a$, as compared with the two stable states of C2 state, and thus assures high luminance and high contrast.

Therefore, in the present invention, in the liquid crystal cell having the aforementioned structure and in the liquid crystal device obtained by applying an alternating electric field, the liquid crystal material and the alignment control film material are selected so that they achieve the uniform alignment state which satisfies:

$\vec{H}/2 \leq \Theta a \leq \vec{H}$ $\vec{H} > \alpha + \delta$

In a given liquid crystal device, pretilt $\alpha$ can be measured according to the method described in Jpn. J. Appl. Phys. vol. 19(1980) NO. 10, Short Notes 2013. That is, a 20 μm-thick cell is prepared by pasting substrates which have been subjected to rubbing in parallel and in opposite directions, and a liquid crystal having SmA phase is sealed in that cell at a temperature range of 0° to 60° C. The liquid crystal cell is rotated on a plane perpendicular to the upper and lower substrates and containing the aligning shaft, and a helium neon laser beam, having a polarizing surface lying at an angle of 45° relative to the rotational axis of the liquid crystal cell, is illuminated on the liquid crystal cell in that rotating state from a direction perpendicular to the rotational axis. The intensity of light which has transmitted the cell is measured at the side of the cell which is not illuminated with the laser beam by a photo diode through a polarizing plate having a transmission axis parallel to the incident polarizing surface. Where $\phi x$ is an angle between the angle of the center of the group of hyperbolic curves of the intensity of transmitted light obtained by interference and the line perpendicular to the liquid crystal cell, we have pretilt $\alpha 0$ by inserting $\phi x$ in the following expression:

$$\sin 2\alpha_0 = \frac{-2\sin\phi_x}{(n_0+n_o)\cdot(\sin\phi_x/n_0)_2}$$

$n_0$: normal light refractive index $n_o$: abnormal light refractive index

The present invention will be described below in detail by way of example.

<EXAMPLE 1>

The liquid crystal cells employed in Example 1 were designed and manufactured in the following manner on the basis of the structure shown in FIGS. 2(a) and 2(b).

Transparent electrodes 22a and 22b of ITO were respectively formed on 1.1 mm-thick glass substrates 21a and 21b by sputtering. The transparent electrodes 22a and 22b, having a thickness of 1500 Å, were shaped in a form of stripes each having a width of 170 μm and separated at intervals of 30 μm. Ta$_2$O$_5$ films were formed to a thickness of 900 Å as the insulator films 23a and 23b to prevent short-circuiting. Thereafter, coating type insulator layers (TiSi=1:1, manufactured by Tokyo Ohkasha) were coated and then burnt at 300° C. for improving the surface state. The thickness of the coating type insulator layer was 1200 Å.

The alignment control films 24a and 24b were formed by coating a solution obtained by diluting polyamide acid (LQ1802, manufactured by Hitachi Kasei) in NMP/nBC= 1/1 at a concentration of 1.5 wt % with a spinner under coating conditions of 2000 rpm and 20 sec and then by burning the coated film at 270° C. for 1 hour. The thickness of the alignment control films was 200 Å.

The alignment control films 24a and 24b were subjected to rubbing in the manner shown in FIG. 3. Rubbing treatment was conducted twice under the conditions that the amount of push ε of the rubbing roller 30 was 0.35 mm, that the rotational speed of the roller was 1000 rpm and that the roller feed speed was 30 mm/sec.

Beads spacers (such as silica beads or alumina beads), having an average diameter size of 0.5 to 1.6 μm, were scattered on one of the thus-manufactured glass substrates 21a and 21b having the alignment control films 24a and 24b formed thereon, and a sealing adhesive which was an epoxy resin adhesive, was formed on the other glass substrate 21b or 21a by screen printing. The two glass substrates 21a and 21b were adhered to each other to form cells having two types of plane structures shown in FIGS. 6(a) and 6(b) (which will be described in detail later). The directions of rubbing conducted on the adhered glass substrates 21a and 21b were substantially parallel to each other.

Thereafter, a pyrimidine-based liquid crystal mixture showing the following phase transition temperatures and property values was heated to Iso phase under a negative pressure. After the liquid crystal was injected into each of the thus-obtained cells due to capillarity, it was gradually cooled, thereby manufacturing liquid crystal devices. The liquid crystal molecule aligned state was observed by driving the devices. It was found that the liquid crystal had a uniform alignment state. Where $\Theta_C$ is an angle formed between the direction of uniaxial alignment treatment for the one substrate 21a and the direction of uniaxial alignment treatment for the other substrate 21b, it satisfies the relationship expressed as follows:

$0° < \theta_C < 20°$ $$\text{Cryst} \xrightarrow{-8.3° \text{ C.}} \text{SmC*} \xrightarrow{67.3° \text{ C.}} \text{SmA} \xrightarrow{91.7° \text{ C.}} \text{Ch} \xrightarrow{100.1° \text{ C.}} \text{Iso}$$

Tilt $\theta = 15.1°$ (at 30° C.)

Spontaneous polarization Ps = 5.5 (nc/cm$^2$) (at 30° C.)

The pretilt α of the above-described liquid crystal cells, measured in the manner described above, was 18°.

Figure 6A:
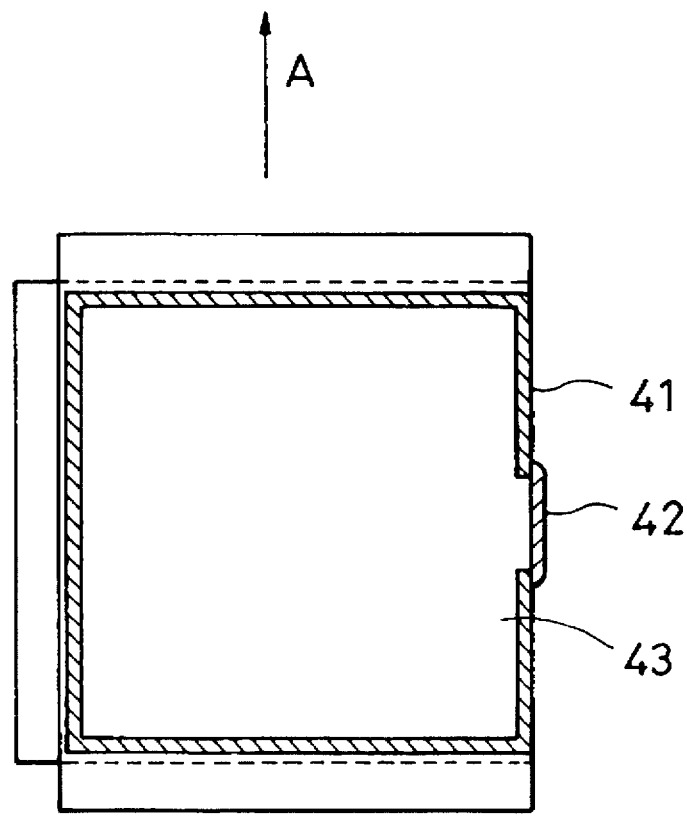
FIGS. 6(a) and 6(b) are plan views showing the liquid crystal cell structures employed in the present invention.
Figure 6B:
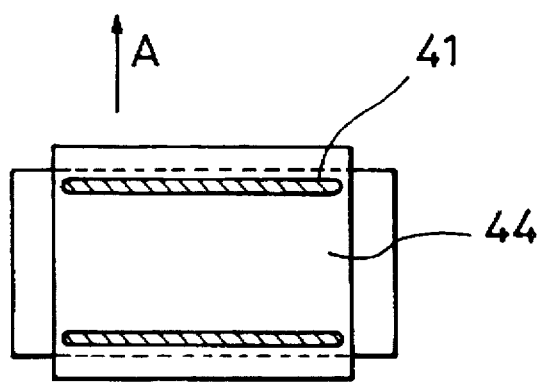
Figure 7A:
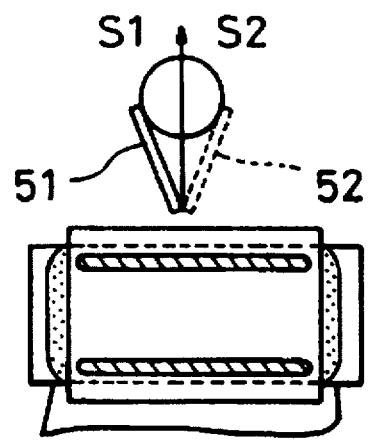
FIGS. 7(a) through 7(c) schematically illustrate a method of evaluating shift of the liquid crystal molecules in Examples of the present invention.
Figure 7B:
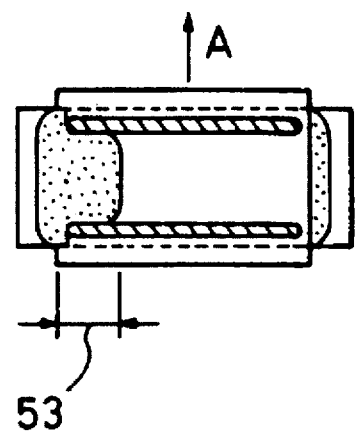
Figure 7C:
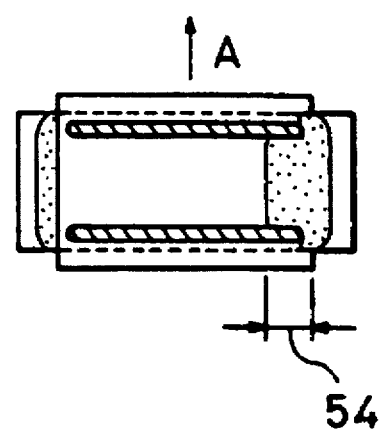

The present inventors examined the relationship between the amount of shift of the liquid crystal and the thickness of the cell using the cells shown in FIGS. 6(a) and 6(b). The cell shown in FIG. 6(b) is closed with a sealing adhesive at two ends thereof and is open at the other two ends so as to enable measurements of the amount and direction of shift of the liquid crystal. FIGS. 7(a), 7(b), and 7(c). illustrates the measurements. As shown in FIG. 7(a), the average molecular axis of the liquid crystal molecules was directed in Si direction beforehand by applying an electric field exceeding a threshold value of the liquid crystal to the liquid crystal device. Nematic liquid crystal was attached, as a marker, to each of the two ends (the open two ends of the cell) of the liquid crystal injected between the substrates 21a and 21b, so that the amount and direction of shift of the liquid crystal could be measured by observing the distance of invasion of the nematic liquid crystal (see FIGS. 7(b) and 7(c)).

A rectangular alternating waveform of ±7 volts and 100 Hz was applied to the cell shown in FIG. 6(b) under either of conditions 1 through 4 shown in FIGS. 8(a) through 8(c) in 10 temperature cycles, and then all the average molecular axes of the liquid crystal molecules were aligned in Si direction. Thereafter, both the samples subjected to the above-described alternating electric field application treatment and a reference which was not subjected to the above treatment were driven by applying a rectangular alternating electric field (pulse width 60 μsec ±7 volts (μm)) for a fixed period of time (14 hours) at 40° C. The applied rectangular alternating electric field was ⅓ of the threshold value which assures switching of the liquid crystal. The direction of the average molecular axis of the liquid crystal molecules remained in S1 direction even after the alternating electric field was applied for 14 hours.

Regarding the samples which were driven in the manner described above, the present inventors measured the amount and direction of shift of the liquid crystal molecules in the manner described above. The results of the measurement are as follows:

|  | Reference | Condition 1 | Condition 2 | Condition 3 | Condition 4 |
|---|---|---|---|---|---|
| Distance of invasion | 26.4 mm | 8.1 mm | 7.9 mm | 4.4 mm | 10.2 mm |

As can be seen from the above Table, shift of the liquid crystal was improved in the samples subjected to AC voltage application while shift of the liquid crystal in reference was great. Further, shift of the liquid crystal is improved by the application of an alternating electric field more in a temperature cycle, such as condition 3, in which the maximum temperature in each cycle is gradually decreased.

In the AC voltage application treatment, where the maximum temperature for each cycle was fixed, there was substantially no difference in the distance of invasion between when the maximum temperature was 72° C. and the maximum temperature was 88° C. Further, where the maximum temperature was fixed for each cycle (in this experiment, the used temperature cycle consisted of 10 cycles), great improvement in the amount of shift of the liquid crystal was not observed and improvement saturated after the 5th cycle.

However, where the maximum temperature for each cycle was gradually decreased in the alternating electric field application treatment, improvement in the amount of shift of the liquid crystal continued. It is thus considered that there is a range in the maximum temperature suitable for improving the amount of shift of the liquid crystal and that the amount of shift of the liquid crystal can be greatly improved by making the maximum temperature for each cycle different for every cycle.

The present inventors measured changes in the thickness of the cell, caused by shift of the liquid crystal, by the method shown in FIGS. 9(a), 9(b) and 9(c) using the liquid crystal device (cell) shown in FIG. 6(a). Unlike the cell shown in FIG. 6(b), the cell shown in FIG. 6(a) is closed with a sealing adhesive at four sides thereof so as to enable measurements of the changes in the thickness of the cell caused by shift of the liquid crystal, that is, the gap between the substrates. A rectangular alternating voltage of ±7 volts and 100 Hz was applied to the cell under either of conditions 1 through 4 shown in FIGS. 8(a) through 8(c) during 10 temperature cycles.

Subsequently, a voltage exceeding the threshold value which assures switching of the liquid crystal was applied to the liquid crystal device, as shown in FIG. 9(a), to align all the average molecular axes of the liquid crystal molecules in the S1 direction beforehand.

Thereafter, the same rectangular alternating electric field (pulse width of 60 μsec, 7 volts/μm) as that applied to the liquid crystal device shown in FIG. 6(b) was applied for a long time. Changes in the thickness of the portion of the cell located near sealing shown in FIG. 9(b) or 9(c) where the cell thickness increase were measured, and the relationship between the changes in the thickness of the cell and the driving time was examined. The results are shown in FIG. 10.

Figure 10:
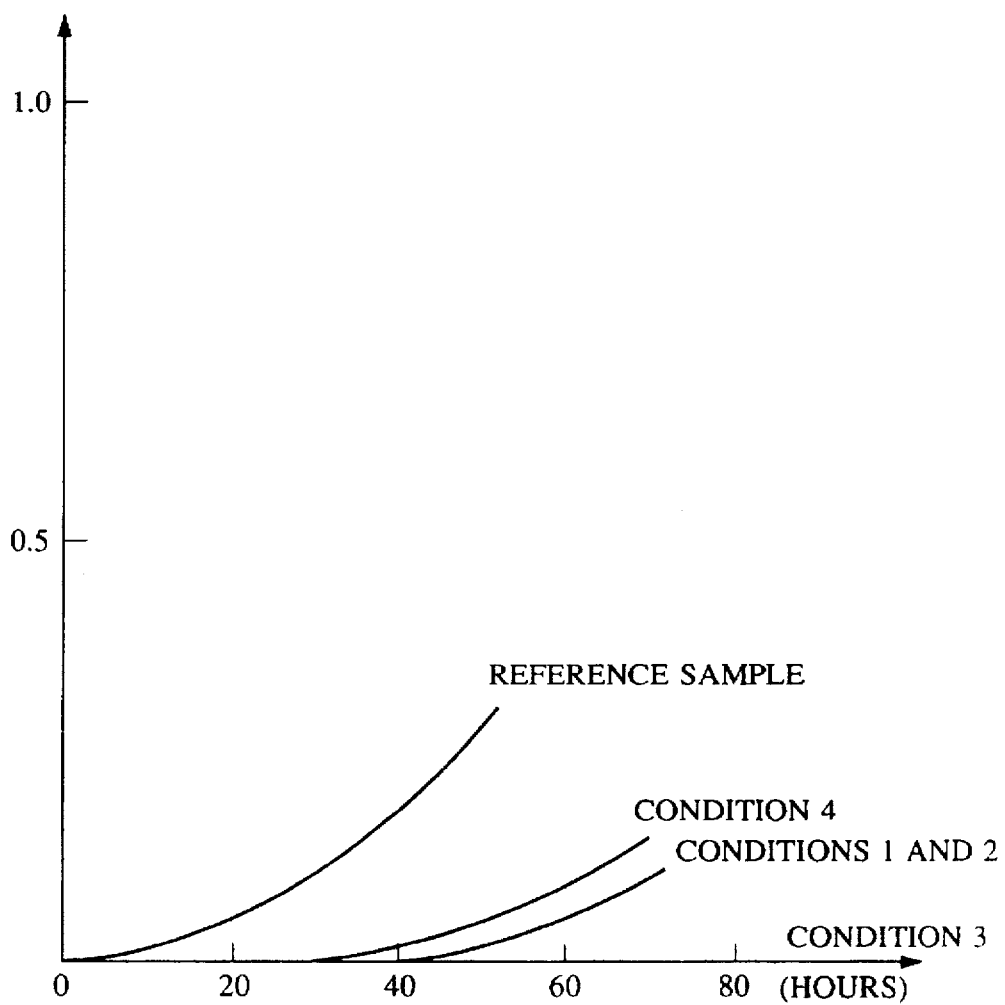
FIGS. 10 and 11 are respectively graphic representations showing the relationship between the driving time and changes in the thickness of the liquid crystal cell in Examples 1 and 2 of the present invention.

As shown in FIG. 10, the results of the measurements conducted on the cell shown in FIG. 6(a) regarding changes in the thickness of the cell corresponded to the results of the experiments conducted on the cell shown in FIG. 6(b) regarding the distance of invasion of the nematic liquid crystal.

As can be seen from FIG. 10, when the cells which were subjected to alternating electric field application treatment under conditions 1, 2 and 4 were driven 70 hours or less, the thickness of the cell varied about several μm, and the screen colored in yellow at the end of the cell. However, the degree of changes in the cell thickness and the degree of coloring were allowable as compared with those observed in reference sample. In the cell treated under condition 3, changes in the thickness of the cell or coloring was not observed after the cell was driven continuously for 1000 hours or longer.

In the above experiments, since the treating time was the same, the maximum temperature and temperature gradient for each temperature cycle were made different in each cycle, because this assures more effective results to restrict shift of the liquid crystal than in the case where the temperature gradient is the same in each cycle.

According to the above experiments, when the liquid crystal cell is treated by applying an alternating electric field thereto in the temperature cycles in which the maximum temperature for each cycle differs, an increase in the thickness of the end portion of the cell, which would occur after the cell has been driven continuously for a long time, can be greatly restricted. In the above treatment, an increase in the thickness of the cell can be restricted more effectively when the maximum temperature for each cycle is reduced in every cycle.

EXAMPLE 2

The liquid crystal cells having a planar structure shown in FIG. 6(b) with alignment control films having an irregular surface were manufactured in the same manner as that of Example 1 except for the structure of the insulator films. In this example, the insulator films were formed during the manufacture of the cell by vehicle process. That is, fine particles of silica, having an average particle size of 400 Å, were dispersed in a 6.0 wt % insulator film solution of Ti and Si mixed at a mixture ratio of 1:1. The thus-obtained solution was printed using a vehicle plate having a roughness of 5 μm. Thereafter, the printed insulator films was temporarily burned for about 10 minutes at 100° C., irradiated with ultraviolet radiation, and then heated for about 1 hour at 300° C. The thickness of the formed insulator film was 200 Å.

The irregularities on the surface of the alignment control film were observed by SEM and AFM. It was found that the width of the irregularities was between 5 and 17 nm, that the density thereof was about 108/mm$^2$ and that the height thereof was between 10 and 25 nm.

After the liquid crystal was injected into each of the above liquid crystal cells, a rectangular alternating voltage of ±7 volts, 100 Hz was applied to the cell under either of temperature conditions 1 through 4. Subsequently, the samples which were subjected to an alternating electric field application treatment and reference sample which were not subjected to the treatment were driven for a long time in the same manner as that of Example 1. Amount of change in the thickness of the portion of the cell where the cell thickness increased was measured by the means shown in FIGS. 9(a), 9(b) and 9(c), and the relationship between the amount of change in the thickness of the cell and the driving time was examined. The results are shown in FIG. 11.

Figure 11:
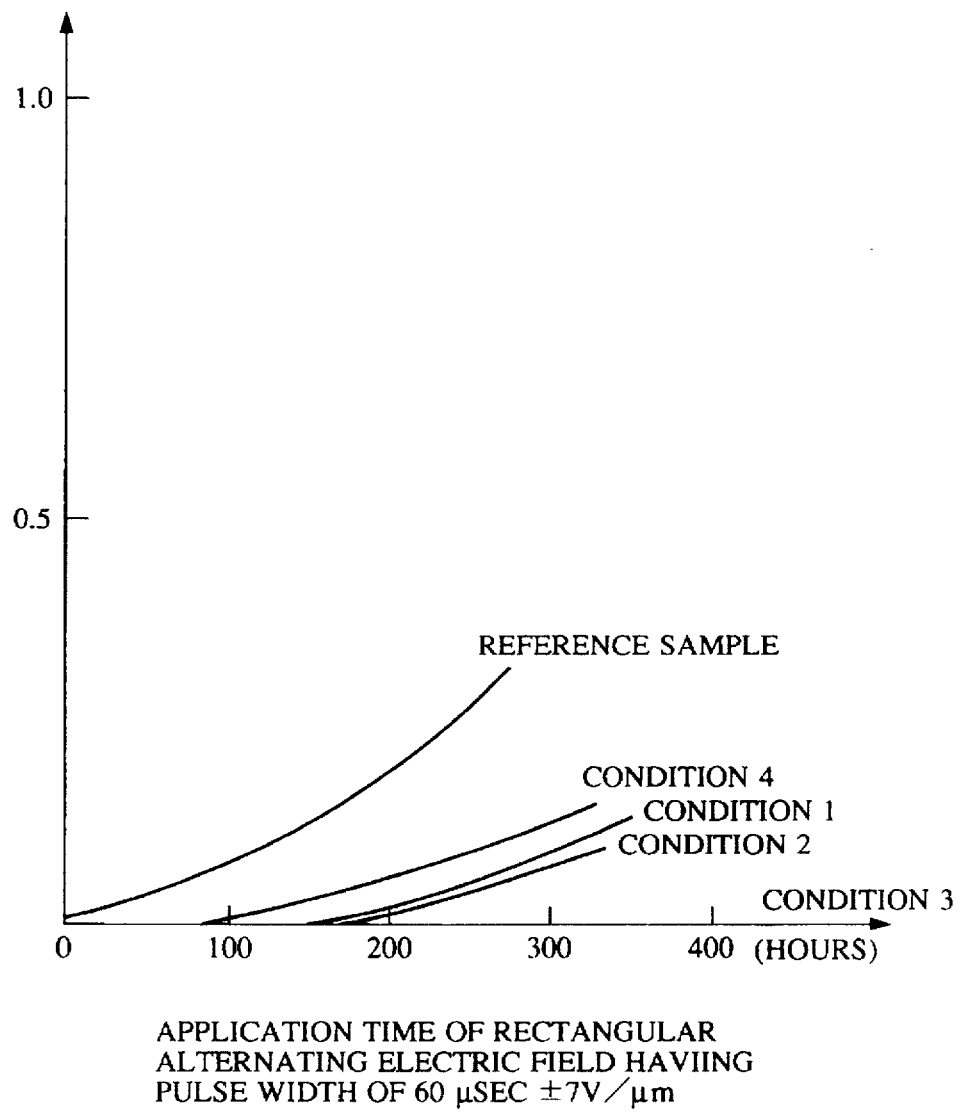

It can be seen from the results shown in FIG. 11 that even in the liquid crystal cells having alignment control films each having an irregular surface, when the manufacturing process contains the process of applying an alternating electric field in the temperature cycles in which the maximum temperature of the cycle varies in every cycle, an increase in the thickness of the end portion of the cell can be greatly reduced. As compared with the results shown in FIG. 10, when the cell has alignment control films each having an irregular surface, an increase in the thickness of the cell, which would occur when the cell is driven for a longer time than the time during which the cells of Example 1 were driven, can be restricted. An increase in the thickness of the cell can be restricted more effectively when the maximum temperature for each cycle is reduced in every cycle.

EXAMPLE 3

Figure 12A:
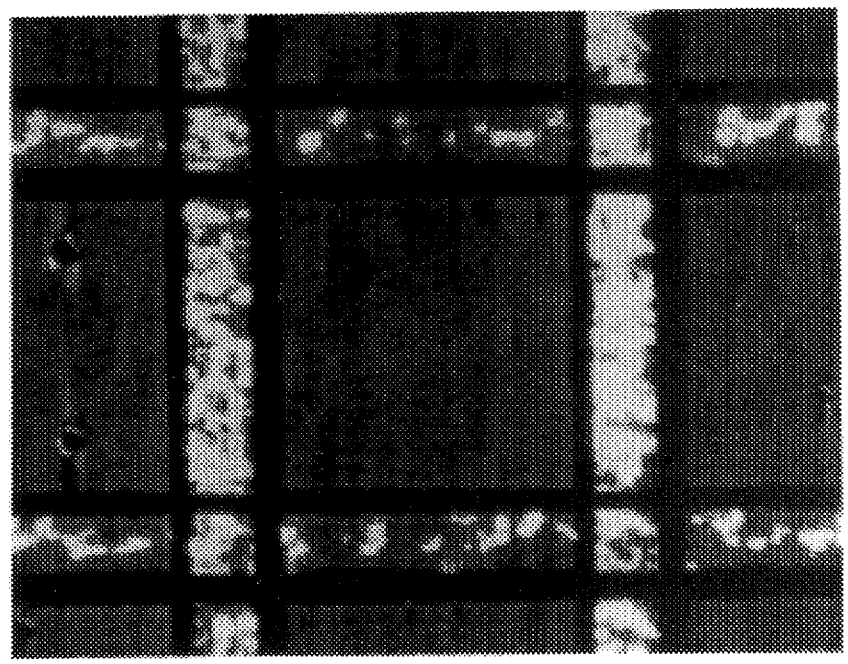
FIGS. 12(a), 12(b), 12(c) and 12(d) are microscopic photographs showing liquid crystal alignment states which have been subjected to alternating electric field application treatment in both Example 3 of the present invention and comparative samples.
Figure 12B:
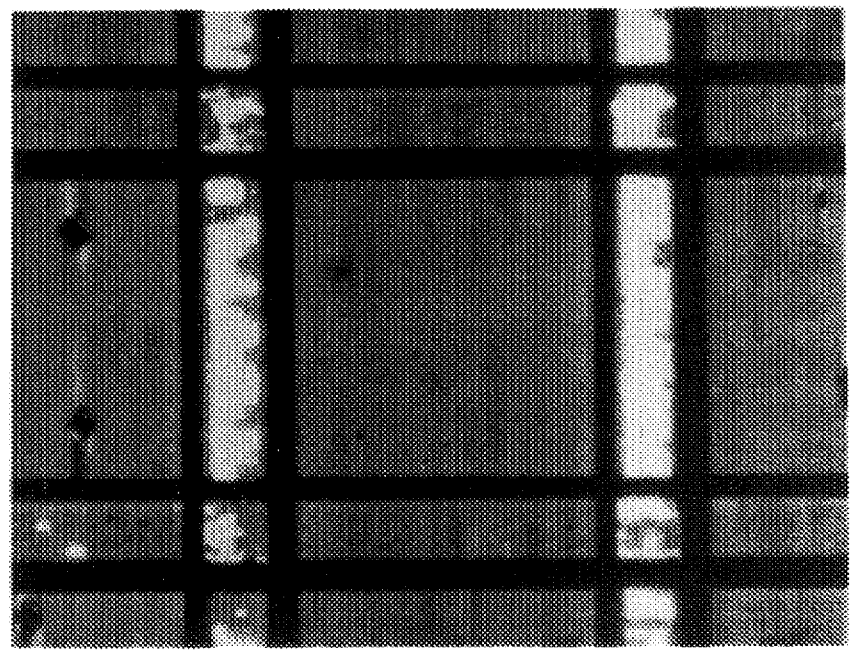
Figure 12C:
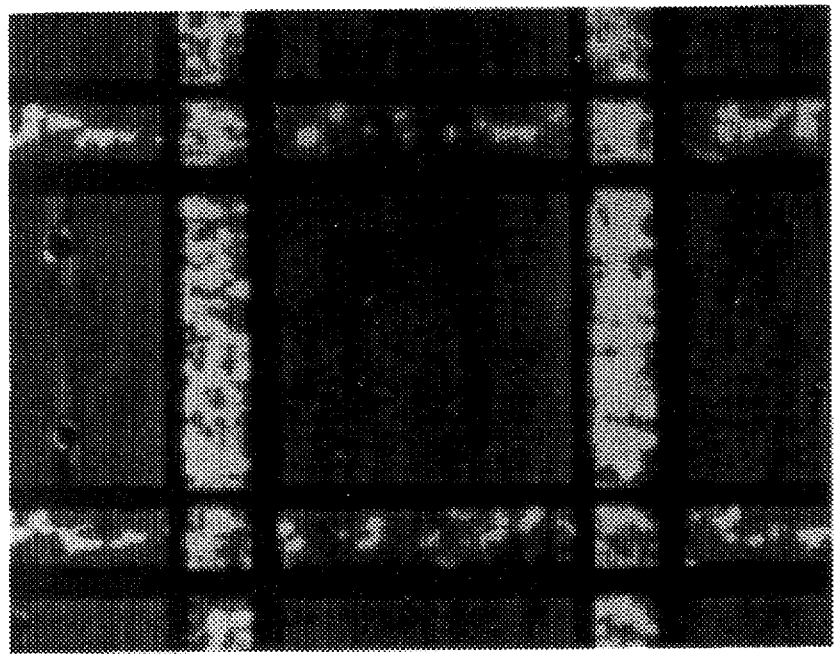
Figure 12D:
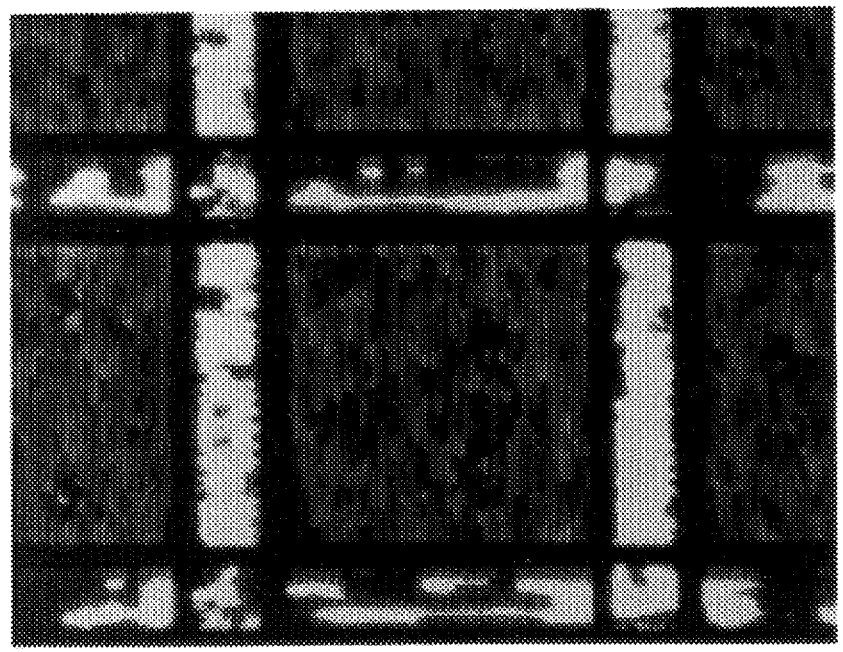

Regarding the liquid crystal cells manufactured in Example 2, the present inventors observed with a microscope the liquid crystal aligned state of sample 3-1 which was subjected to alternating electric field application treatment under condition 3 shown in FIG. 8 and of sample 3-2 which was subjected to alternating electric field application treatment under condition 3 with Tmax=90° C. FIGS. 12(a) and 12(b) respectively show the aligned states of the sample 3-1 obtained before and after the alternating electric field application. FIGS. 12(c) and 12(d) respectively show the aligned states of the sample 3-2 obtained before and after the alternating electric field application.

Tmax for sample 3-2 exceeds a temperature which is lower by 3° C. than the temperature which ensures that the liquid crystal employed in the liquid crystal cell undergoes phase transition from SmA phase to Ch phase.

As can be clearly seen from the comparison between the alignment states shown FIGS. 12(a) and 12(b) and the aligned states shown in FIGS. 12(c) and 12(d), in the sample (sample 3-2) which is subjected to alternating electric field application treatment in which the maximum temperature of each temperature cycle exceeds a temperature which is lower by 3° C. than the temperature which ensures phase transition of the used liquid crystal from SmA phase to Ch phase in a temperature increasing process, wrinkle-shaped defects may occur. Further, since the extinction position in the pixel deviates, deteriorating display of, for example, CR.

It is apparent from the above experiments that a desirable maximum temperature in the temperature cycle in the alternating electric field application treatment conducted in the present invention is lower by at least 3° C. than the temperature which ensures phase transition of the used liquid crystal from SmA phase to Ch phase in a temperature increasing process. It is a known fact that the liquid crystal having Ch phase takes on homeotropic structure due to anisotropy of dielectric constant when applied with an electric field. The present inventors consider that the wrinkled aligned state is generated because application of an electric field in a SmA phase temperature range which is close to that of Ch phase may not provide the homeotropic alignment but adversely affects the liquid crystal in some ways.

EXAMPLE 4

Figure 13:
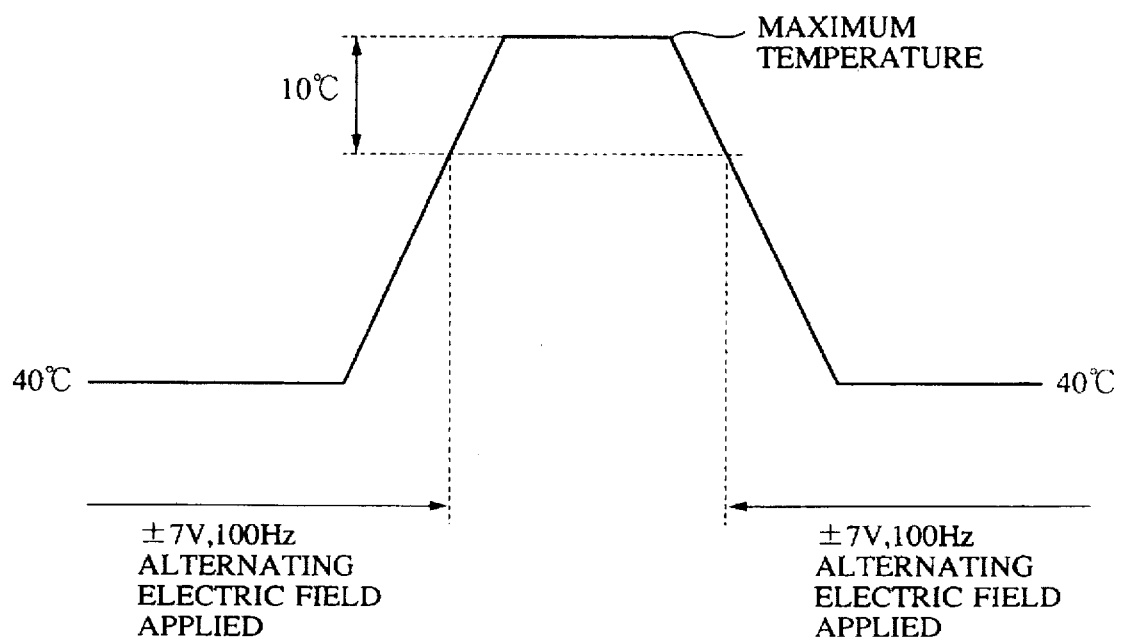
FIG. 13 is a graph showing how the alternating electric field application treatment is conducted in each temperature cycle in Example 4 of the present invention.

Regarding the liquid crystal cells manufactured in Example 2, a rectangular alternating voltage of ±7 volts and 100 Hz was applied on the liquid crystal cells under condition 3 only when the temperature in each cycle was lower than the maximum temperature of that cycle by at least 10° C., as shown in FIG. 13. Regarding the thus-obtained samples, when increase in the thickness of the cell and the relationship between the increase in the cell thickness of the driving time were examined, the same results as those obtained in Example 1 under condition 3 were obtained, i.e., there was no increase in the thickness of the cell which was driven for a long time. It was thus found that the period during which an alternating electric field was applied could be selected, decreasing power consumption while achieving prevention of shift of the liquid crystal.

As will be understood from the foregoing description, in the method according to the present invention, even when the liquid crystal display device is driven for a long period of time, an increase in the thickness of the cell, caused by shift of the liquid crystal, can be prevented. Consequently, change in the color of the display portion of the liquid crystal display device can be prevented, and durability of the liquid crystal display device can thus be greatly improved.

What is claimed is:

1. A method of aligning liquid crystals, said method comprising the step of:

treating chiral smectic liquid crystal sandwiched between a pair of substrates each having an electrode by applying an alternating electric field between the substrates under periodically changing temperature conditions in which a width of changes of the temperature for a single period differs in every period, wherein in the temperature conditions, a minimum temperature value of each period is fixed while a maximum temperature value is varied at every period.

2. A method of aligning liquid crystals according to claim 1, wherein in the temperature conditions, periodic increase and decrease of the temperature are repeated.

3. A method of aligning liquid crystals according to claim 1, wherein in the temperature conditions, a maximum temperature value of each period sequentially decreases at every period.

4. A method of aligning liquid crystals according to claim 1, wherein changes in the temperature of the temperature conditions are set within a temperature range which ensures that the chiral smectic liquid crystal shows smectic phase.

5. A method of aligning liquid crystals according to claim 4, wherein the changes in the temperature in the temperature conditions ensure that the liquid crystal undergoes phase transition between smectic A phase and chiral smectic C phase in each period.

6. A method of aligning liquid crystals according to claim 1, wherein the liquid crystal shows cholesteric phase in a predetermined temperature range, and wherein a maximum temperature value in each period in the temperature conditions is lower by at least 3° C. than a temperature at which the liquid crystal undergoes phase transition from smectic A phase to cholesteric phase.

7. A method of aligning liquid crystals according to claim 1, wherein an angle at which liquid crystal molecules form relative to an interface between the liquid crystal and the substrate is 10° to 30°.

8. A method of aligning liquid crystals according to claim 1, wherein an effective voltage of the applied alternating electric field is larger than an effective voltage of a threshold voltage of the liquid crystal at an actually used temperature in the temperature range which ensures that the used liquid crystal has chiral smectic phase.

9. A method of aligning liquid crystals according to claim 1, wherein an effective voltage of the applied alternating electric field is 10 to 1000 times an effective voltage of a threshold voltage of the liquid crystal at an actually used temperature in the temperature range which ensures that the used liquid crystal has chiral smectic phase.

10. A method of aligning liquid crystals according to claim 1, wherein an alignment control film is formed at an interface between at least one of the substrates and the liquid crystal.

11. A method of aligning liquid crystals according to claim 10, wherein a surface of the alignment control film which faces the liquid crystal has fine irregularities.

12. A method of aligning liquid crystals according to claim 11, wherein an insulator layer having a plurality of fine particles filled therein is formed below the alignment control film to cause the fine irregularities.

13. A method of aligning liquid crystals according to claim 10, wherein an insulator layer having a plurality of particles disposed therein is formed below the alignment control film.

14. A method of manufacturing liquid crystal devices, said method comprising the steps of:

forming a liquid crystal cell in which a pair of electrode substrates oppose each other with a gap therebetween;

injecting chiral smectic liquid crystal between the substrates in the cell; and applying an alternating electrical field to the electrode substrates under periodically changing temperature conditions in which a width of changes of the temperature for a single period differs in every period, wherein in the temperature conditions in which the alternating electric field is applied, a minimum temperature value of each period is fixed while a maximum temperature value is varied at every period.

15. A method of manufacturing liquid crystal devices according to claim 14, wherein in the temperature conditions in which the alternating electric field is applied, periodic increase and decrease of the temperature are repeated.

16. A method of manufacturing liquid crystal devices according to claim 14, wherein in the temperature conditions in which the alternating electric field is applied, a maximum temperature value of each period sequentially decreases at every period.

17. A method of manufacturing liquid crystal devices according to claim 14, wherein changes in the temperature in the temperature conditions in which the alternating electric field is applied are set within a temperature range which ensures that the chiral smectic liquid crystal shows smectic phase.

18. A method of manufacturing liquid crystal devices according to claim 17, wherein changes in the temperature in the temperature conditions in which the alternating electric field is applied are set so as to ensure that the liquid crystal undergoes phase transition between smectic A phase and chiral smectic C phase in each period.

19. A method of manufacturing liquid crystal devices according to claim 14, wherein the liquid crystal shows cholesteric phase in a predetermined temperature range, and wherein a maximum temperature value in each period in the temperature conditions in which the alternating electric field is applied is lower by at least 3° C. than a temperature at which the liquid crystal undergoes phase transition from smectic A phase to cholesteric phase.

20. A method of manufacturing liquid crystal devices according to claim 14, wherein an angle that liquid crystal molecules form relative to an interface between the liquid crystal and the substrate is 10° to 30°.

21. A method of manufacturing liquid crystal devices according to claim 14, wherein an effective voltage of the applied alternating electric field is larger than an effective voltage of a threshold voltage of the liquid crystal at an actually used temperature in the temperature range which ensures that the used liquid crystal has chiral smectic phase.

22. A method of manufacturing liquid crystal devices according to claim 14, wherein an effective voltage of the applied alternating electric field is 10 to 1000 times an effective voltage of a threshold voltage of the liquid crystal at an actually used temperature in the temperature range which ensures that the used liquid crystal has chiral smectic phase.

23. A method of manufacturing liquid crystal devices according to claim 14, wherein an alignment control film is formed at an interface between at least one of the substrates and the liquid crystal.

24. A method of manufacturing liquid crystal devices according to claim 23, wherein a surface of the alignment control film which faces the liquid crystal has fine irregularities.

25. A method of manufacturing liquid crystal devices according to claim 24, wherein an insulator layer having a plurality of fine particles filled therein is formed below the alignment control film to cause the fine irregularities.

26. A method of manufacturing liquid crystal devices according to claim 23, wherein an insulator layer having a plurality of fine particles disposed therein is formed below the alignment control film.

* * * * *

UNITED STATES PATENT AND TRADEMARK OFFICE
CERTIFICATE OF CORRECTION

PATENT NO. : 5,742,369
DATED : April 21, 1998
INVENTOR(S) : TADASHI MIHARA, ET AL.

It is certified that error appears in the above-identified patent and that said Letters Patent is hereby corrected as shown below:

COLUMN 1

Line 31, "exhibita" should read --exhibit a-- and "so-called" should read --so called--.

COLUMN 6

Line 23, "dc voltage" should read --DC voltage--.

COLUMN 7

Line 41, "$\text{⊕}/2 \leq \theta a \leq \vec{H}$" should read --$\text{⊕}/2 \leq \theta a \leq \text{⊕}$--.

COLUMN 8

Lines 1-7,

"$$sin2\alpha_0 = \frac{-2\sin\phi_x}{(n_0+n_0) \cdot (\sin\phi_x/n_0)_2}$$"

$n_0$: normal light refractive index $n_0$: abnormal light refractive index should read -- $$\sin 2\alpha_o = \frac{-2\sin\phi_x}{(n_o+n_e) \cdot \sqrt{1-(\sin\phi_x/n_o)^2}}$$ --.

$n_o$: normal light refractive index $n_e$: abnormal light refractive index

UNITED STATES PATENT AND TRADEMARK OFFICE
CERTIFICATE OF CORRECTION

PATENT NO. : 5,742,369

DATED : April 21, 1998

INVENTOR(S) : TADASHI MIHARA, ET AL.

It is certified that error appears in the above-identified patent and that said Letters Patent is hereby corrected as shown below:

COLUMN 9

Line 17, "7(c). illustrates" should read
        --7(c) illustrate--.

COLUMN 12

Line 28, "deteriorating" should read --it deteriorates--.

Signed and Sealed this

Thirtieth Day of March, 1999

*Attest:*

*Attesting Officer*

Q. TODD DICKINSON

*Acting Commissioner of Patents and Trademarks*